(12) United States Patent
Kim et al.

(10) Patent No.: US 11,477,867 B2
(45) Date of Patent: Oct. 18, 2022

(54) LED DRIVING APPARATUS AND CONTROL METHOD THEREOF

(71) Applicant: SAMSUNG ELECTRONICS CO., LTD., Suwon-si (KR)

(72) Inventors: Moonyoung Kim, Suwon-si (KR); Jeongil Kang, Suwon-si (KR); Shinwook Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/274,349

(22) PCT Filed: Aug. 14, 2019

(86) PCT No.: PCT/KR2019/010359
§ 371 (c)(1),
(2) Date: Mar. 8, 2021

(87) PCT Pub. No.: WO2020/054987
PCT Pub. Date: Mar. 19, 2020

(65) Prior Publication Data
US 2021/0329760 A1    Oct. 21, 2021

(30) Foreign Application Priority Data

Sep. 10, 2018 (KR) .................. 10-2018-0107680

(51) Int. Cl.
*H05B 45/325* (2020.01)
*H05B 45/14* (2020.01)
(Continued)

(52) U.S. Cl.
CPC .......... *H05B 45/325* (2020.01); *H05B 45/14* (2020.01); *H05B 45/30* (2020.01); *H05B 45/34* (2020.01); *H05B 45/3725* (2020.01)

(58) Field of Classification Search
CPC ...... H05B 45/10; H05B 45/325; H05B 45/14; H05B 45/30; H05B 45/34; H05B 45/3725
See application file for complete search history.

(56) References Cited

U.S. PATENT DOCUMENTS 9,779,657 B2   10/2017   Kim et al.
9,791,110 B2   10/2017   Hu et al.
(Continued)

FOREIGN PATENT DOCUMENTS

JP       3213524 U       11/2017
KR    10-1046124 B1       7/2011
(Continued)

OTHER PUBLICATIONS

International Search Report dated Nov. 25, 2019 issued by the International Searching Authority in International Application No. PCT/KR2019/010359 (PCT/ISA/210).
(Continued)

*Primary Examiner* — Abdullah A Riyami
*Assistant Examiner* — Syed M Kaiser
(74) *Attorney, Agent, or Firm* — Sughrue Mion, PLLC (57) ABSTRACT

Disclosed is an LED driving apparatus. The LED driving apparatus comprises an LED driving circuit, a power supply unit for supplying a driving voltage to the LED driving circuit, a voltage ripple controller located between the LED driving circuit and the power supply unit, and a switching unit for controlling a voltage supplied to the LED driving circuit by turning on or off the voltage ripple controller according to a duty ratio of a pulse width modulation (PWM) dimming signal.

11 Claims, 9 Drawing Sheets

(51) Int. Cl.
*H05B 45/34* (2020.01)
*H05B 45/3725* (2020.01)
*H05B 45/30* (2020.01)

(56) References Cited

U.S. PATENT DOCUMENTS

| | | | |
|---|---|---|---|
| 9,881,563 B2 | 1/2018 | Joo et al. | |
| 9,984,614 B2 | 5/2018 | Hwang | |
| 10,342,085 B2 | 7/2019 | Joo et al. | |
| 10,600,359 B2 | 3/2020 | Park et al. | |
| 2013/0187556 A1* | 7/2013 | Zeng | H05B 33/12 |
| | | | 315/246 |
| 2013/0257707 A1 | 10/2013 | Matsumura | |
| 2014/0035484 A1 | 2/2014 | Carli | |
| 2014/0265844 A1* | 9/2014 | Sadwick | H05B 45/3725 |
| | | | 315/85 |
| 2017/0215240 A1* | 7/2017 | Sawada | H02M 3/33523 |
| 2018/0013344 A1* | 1/2018 | Morici | H02M 1/08 |
| 2018/0110102 A1* | 4/2018 | Adams | H05B 45/20 |

FOREIGN PATENT DOCUMENTS

| | | |
|---|---|---|
| KR | 10-2013-0045056 A | 5/2013 |
| KR | 10-1260467 B1 | 5/2013 |
| KR | 10-1273220 B1 | 6/2013 |
| KR | 101273220 B1 * | 6/2013 ............. Y02D 30/70 |
| KR | 10-2013-0111374 A | 10/2013 |
| KR | 10-2015-0019001 A | 2/2015 |
| KR | 10-2016-0072344 A | 6/2016 |
| KR | 10-2016-0141456 A | 12/2016 |
| KR | 10-2017-0037710 A | 4/2017 |
| KR | 10-2018-0028243 A | 3/2018 |

OTHER PUBLICATIONS

Written Opinion dated Nov. 25, 2019 issued by the International Searching Authority in International Application No. PCT/KR2019/010359 (PCT/ISA/237).

* cited by examiner

LED DRIVING APPARATUS AND CONTROL METHOD THEREOF

TECHNICAL FIELD

This disclosure relates to a light emitting diode (LED) driving apparatus and a control method thereof. More particularly, the disclosure relates to an LED driving apparatus using a pulse width modulation (PWM) dimming signal and a control method thereof.

BACKGROUND ART

Recently, an LED is used as a light source in various fields. The LED may cause a significant current change even with a small change in voltage applied according to electrical characteristics. In that output luminance, gray level, or the like of the LED is dependent on the current flowing in the LED, there may be a problem that a small change in the current may cause a change in light emission intensity, failure or flickering a user may recognize, shake of a screen, or the like.

A PWM dimming method is mainly used as a method of dimming an LED. A method of turning on/off the operation of the LED driving circuit without a PWM dimming field-effect transistor (FET) may have an advantage of adjusting the output brightness without having to have an additional dimming FET in the LED driving apparatus, but a fine current difference may occur due to a low frequency ripple of the input voltage, or the like.

In an interval with a low PWM dimming signal, LED may cause flickering which may be recognized by the eyes of a user even with a fine current change, there is a move to prevent flickering or shaking even in an interval where the PWM dimming signal is low, that is a situation with a low gray level.

DISCLOSURE

Technical Problem

The disclosure has been made to solve the above-described problems, and an object of the disclosure is to provide an LED driving apparatus to provide constant voltage in a low-grayscale and a control method thereof.

An object of the disclosure is to provide an LED driving apparatus to prevent shaking or flickering of a screen due to a fine current or voltage change and a control method thereof.

Technical Solution

According to an embodiment, an LED driving apparatus includes an LED driving circuit, a power supply unit configured to supply a driving voltage to the LED driving circuit, a voltage ripple controller located between the LED driving circuit and the power supply unit, and a switching unit configured to control a voltage to be supplied to the LED driving circuit by turning on or off the voltage ripple controller according to a duty ratio of a pulse width modulation (PWM) dimming signal.

The switching unit may, based on the duty ratio of the PWM dimming signal being less than a predetermined threshold value, control an internal voltage of the voltage ripple controller to be supplied to the LED driving circuit by turning off the voltage ripple controller, and based on the duty ratio of the PWM dimming signal being greater than or equal to the predetermined threshold value, control the driving voltage to be supplied to the LED driving circuit by turning on the voltage ripple controller.

The voltage ripple controller may include a first constant voltage element and a second constant voltage element, and the switching unit may include a switch connected to one end and other end of the second constant voltage element, based on the duty ratio of the PWM dimming signal being less than the predetermined threshold value, control the voltage of the first constant voltage element to be supplied to the LED driving circuit by turning off the second constant voltage element through the switch, based on the duty ratio of the PWM dimming signal being greater than or equal to the predetermined value, control the driving voltage to be supplied to the LED driving circuit by turning on the second constant voltage element through the switch.

The voltage ripple controller may further include a first resistance, a first transistor connected to one end of the first resistance, and a second resistance connected to other end of the first resistance and one end of the first constant voltage element, and the one end of the second constant voltage element may be connected to the other end of the first constant voltage element and the one end of the switching unit, and the other end of the second constant voltage element may be connected to the other end of the switching unit.

Based on the duty ratio of the PWM dimming signal being greater than or equal to the predetermined threshold value, the driving voltage dropped by the first resistance and the first transistor may be supplied to the LED driving circuit, and based on the duty ratio of the PWM dimming signal being less than the predetermined threshold value, voltage of the first constant voltage element dropped by the first transistor and the second resistance may be supplied to the LED driving circuit.

The switching unit may, based on identification that the duty ratio of the PWM dimming signal is changed from the predetermined threshold or more to less than the predetermined threshold value, turn off the second constant voltage element through the switch.

The LED driving circuit may include a plurality of LED driving circuits, and the switching unit may turn on or off the voltage ripple controller according to an average value of the duty ratio of the PWM dimming signal supplied to each of the plurality of LED driving circuits.

The switching unit may turn on or off the voltage ripple controller based on a high signal period interval of the PWM dimming signal.

According to an embodiment, a control method of a light emitting diode (LED) driving apparatus including an LED driving circuit, a power supply unit to supply a driving voltage to the LED driving circuit and a voltage ripple controller located between the LED driving circuit and the power supply unit includes identifying a duty ratio of a pulse width modulation (PWM) dimming signal and controlling a voltage to be supplied to the LED driving circuit by turning on or off the voltage ripple controller according to the identification result.

The controlling the voltage may include, based on the duty ratio of the PWM dimming signal being less than a predetermined threshold value, controlling an internal voltage of the voltage ripple controller to be supplied to the LED driving circuit by turning off the voltage ripple controller and based on the duty ratio of the PWM dimming signal being greater than or equal to the predetermined threshold value, controlling the driving voltage to be supplied to the LED driving circuit by turning on the voltage ripple controller.

The voltage ripple controller may include a first constant voltage element and a second constant voltage element, and the controlling the interval voltage of the voltage ripple controller to be supplied to the LED driving circuit may include, based on the duty ratio of the PWM dimming signal being less than the predetermined threshold value, controlling the voltage of the first constant voltage element to be supplied to the LED driving circuit by turning off the second constant voltage element through a switch included in the LED driving apparatus, and the controlling the driving voltage to be supplied to the LED driving circuit may include, based on the duty ratio of the PWM dimming signal being greater than or equal to the predetermined value, controlling the driving voltage to be supplied to the LED driving circuit by turning on the second constant voltage element through the switch, and the switch may be connected to one end and other end of the second constant voltage element.

The voltage ripple controller may further include a first resistance, a first transistor connected to one end of the first resistance, and a second resistance connected to other end of the first resistance and one end of the first constant voltage element, and the one end of the second constant voltage element may be connected to the other end of the first constant voltage element and the one end of the switch, and the other end of the second constant voltage element may be connected to the other end of the switch.

The controlling the internal voltage of the voltage ripple controller to be supplied to the LED driving circuit may include providing the voltage of the first constant driving element dropped by the first transistor and the second resistance to the LED driving circuit, the controlling the driving voltage to be supplied to the LED driving circuit may include, based on the duty ratio of the PWM dimming signal being greater than or equal to the predetermined threshold value, supplying the driving voltage dropped by the first resistance and the first transistor to the LED driving circuit.

The method may include, based on identification that the duty ratio of the PWM dimming signal is changed from the predetermined threshold or more to less than the predetermined threshold value, turning off the second constant voltage element through the switch.

The controlling the voltage may include turning on or off the voltage ripple controller based on a high signal period interval of the PWM dimming signal.

The LED driving circuit may include a plurality of LED driving circuits, and the controlling the voltage may include controlling the voltage to be supplied to the LED driving circuit by turning on or off the voltage ripple controller according to an average value of the duty ratio of the PWM dimming signal supplied to each of the plurality of LED driving circuits.

Effect of Invention

According to various embodiments as described above, flickering that is recognizable by the user's eyes in a low gray scale may be prevented.

In a PWM dimming method, a clean screen without a shaking phenomenon due to ripple of a current flowing in an LED or applied voltage may be provided to a user.

BEST MODE FOR CARRYING OUT THE INVENTION

-

MODE FOR CARRYING OUT THE INVENTION

After terms used in the present specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms such as "first," "second," and the like may be used to describe various components, but the components should not be limited by the terms. The terms are used to distinguish a component from another.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

In exemplary embodiments of the present disclosure, a 'module' or a '~er/~or' may perform at least one function or operation, and be implemented by hardware or software or be implemented by a combination of hardware and software.

In addition, a plurality of 'modules' or a plurality of '~ers/~ors' may be integrated in at least one module and be implemented by at least one processor (not illustrated) except for a 'module' or a '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

Figure 1:
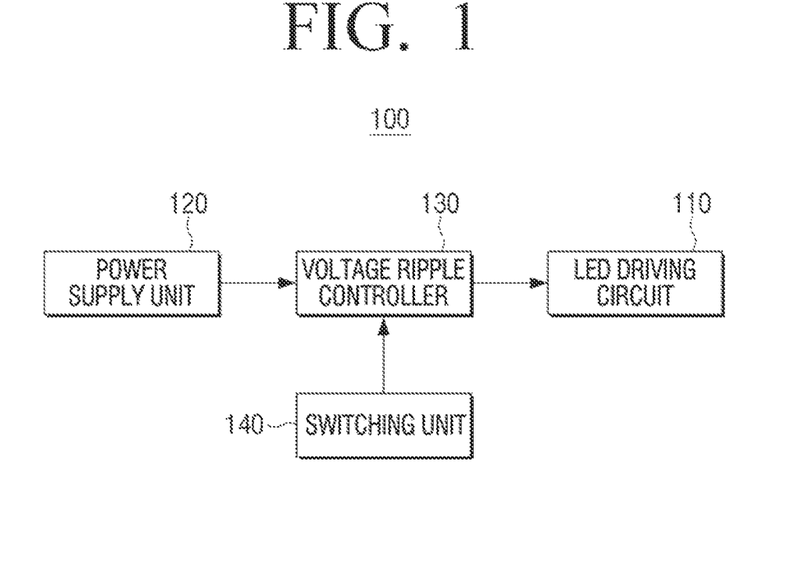
FIG. 1 is a block diagram illustrating a configuration of an LED driving apparatus according to an embodiment.

FIG. 1 is a block diagram illustrating a configuration of an LED driving apparatus according to an embodiment.

As illustrated in FIG. 1, an LED driving apparatus 100 according to an embodiment includes an LED driving circuit 110, a power supply unit 120, a voltage ripple controller 130 and a switching unit 140.

The LED driving circuit 110 according to an embodiment may drive an LED panel (not shown). For example, the LED driving circuit 110 may drive each LED pixel by applying a driving voltage or a driving current to each LED pixel constituting the LED display panel by the control of a processor (not shown). The LED driving circuit 110 may be referred to as a panel driving unit, and an LED panel may be referred to as a display panel, or the like, but the term LED driving circuit 110 and the LED panel, respectively, will be used for convenience.

The LED driving circuit 110 may control the brightness of the light sources with a pulse width modulation (PWM) signal of which duty ratio is varied, or may control the brightness of the light sources by varying the intensity of the current. Here, the PWM signal may control ratio of light on and light off of light sources and the duty ratio (%) thereof may be determined according to a dimming value input from the processor (not shown).

The LED driving circuit 110 according to an embodiment may control the brightness of the light source, that is, the LED light emitting element based on the PWM dimming signal of which duty ratio (%) is varied, or may control the brightness of the LED light emitting element by varying the intensity of the current. It is also possible to vary both the duty ratio and the intensity of the current. The PWM dimming signal may be provided a voltage ripple controller 130, a switching unit 140, or the like, in addition to the LED driving circuit 110.

The power supply unit 120 according to an embodiment may supply a driving voltage to the LED driving circuit 110. The power supply unit 120 may supply power to each configuration in the LED driving apparatus 100, in addition to the LED driving circuit 110. Specifically, the power supply unit 120 may generate driving power required for driving the LED driving apparatus 100 and may supply the generated driving power to each configuration.

Hereinbelow, the voltage supplied from the power supply unit 120 may be referred to as driving voltage $V_{DRV}$.

The voltage ripple controller 130 according to an embodiment may be located between the LED driving circuit 110 and the power supply unit 120. For example, one end of the voltage ripple controller 130 may be connected to the power supply unit 120 and the other end may be connected to the LED driving circuit 110.

The voltage ripple controller 130 according to an embodiment may include a first constant voltage element. The first constant voltage element may be an element used for obtaining a voltage having a constant size. The constant voltage element may be referred to as a constant voltage diode, a Zener diode, or the like, but is not limited thereto, and may be implemented with various types of elements that may provide a voltage of a constant magnitude to form stable constant voltage source in a circuit. Hereinafter, the voltage supplied by the first constant voltage element will be referred to as $V_{ZD1}$.

The switching unit 140 according to an embodiment may control the magnitude of the voltage provided to the LED driving circuit 110. For example, the switching unit 140 may control the voltage provided to the LED driving circuit 110 by turning on or off the voltage ripple controller 130 according to the duty ratio of the PWM dimming signal. For example, if the duty ratio of the PWM dimming signal is less than a predetermined threshold value, the voltage ripple controller 130 may be turned off to control the internal voltage of the voltage ripple controller 130 to be provided to the LED driving circuit 110. The voltage ripple controller 130 may include first and second constant voltage elements. In this example, the switching unit 140 may turn off the second constant voltage element and may cause the voltage of the first constant voltage element to be provided to the LED driving circuit 110.

As another example, if the duty ratio of the PWM dimming signal is greater than or equal to a predetermined threshold value, the voltage ripple controller 130 may be turned on to control the driving voltage to be provided to the LED driving circuit 110. The switching unit 140 may turn on the second constant voltage element, and may allow the driving voltage supplied from the power supply unit 120 to be provided to the LED driving circuit 110. Here, the PWM dimming signal may have a high or a low signal (on or off). If the cycle of the waveform is Tc, the high signal of the PWM dimming signal may vary from 0 to Tc. If the interval in which the PWM dimming signal is a high signal is Td, the duty ratio is 100*Td/Tc [%]. The duty ratio may be referred to as a duty cycle, but will hereinafter be referred to as a duty ratio for convenience. For example, the PWM dimming signal may have a duty ratio of 100%, 50%, 30%, 5%, or the like, and the duty ratio may vary depending on the high signal ratio at one period Tc.

Figure 2:
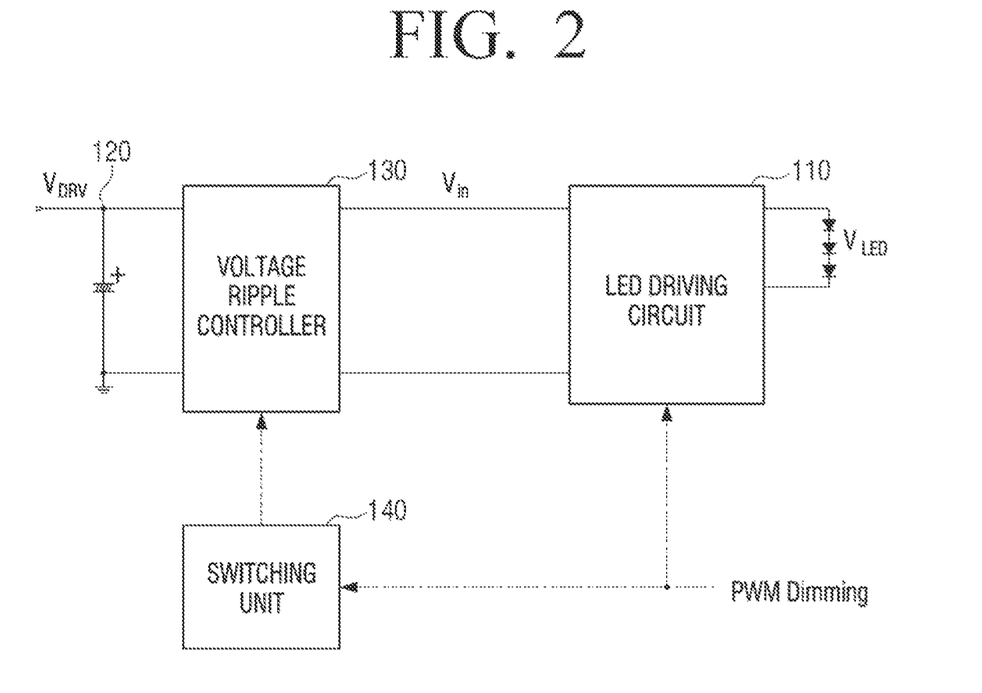
FIG. 2 is a circuit diagram illustrating a configuration of an LED driving apparatus according to an embodiment.

FIG. 2 is a circuit diagram illustrating a configuration of the LED driving apparatus 100 according to an embodiment.

Referring to FIG. 2, the voltage ripple controller 130 may be provided between the power supply unit 120 and the LED driving circuit. The switching unit 140 may control the voltage ripple controller 130 based on the PWM dimming signal.

For example, the voltage ripple controller 130 may bypass the $V_{DRV}$ according to the output voltage of the power supply unit 120. The $V_{DRV}$ may be input voltage ($V_{in}$) of the LED driving circuit 110.

For another example, the voltage ripple controller 130 may provide the voltage $V_{ZD1}$ corresponding to the first constant voltage element provided therein to the LED driving circuit 110. In this example, the voltage $V_{ZD1}$ corresponding to the first constant voltage element may be the input voltage Vin of the LED driving circuit 110. Since the element and the load, or the like, in the circuit are not ideal, voltage drop and voltage loss, or the like, may be generated. This will be described later.

Figure 3:
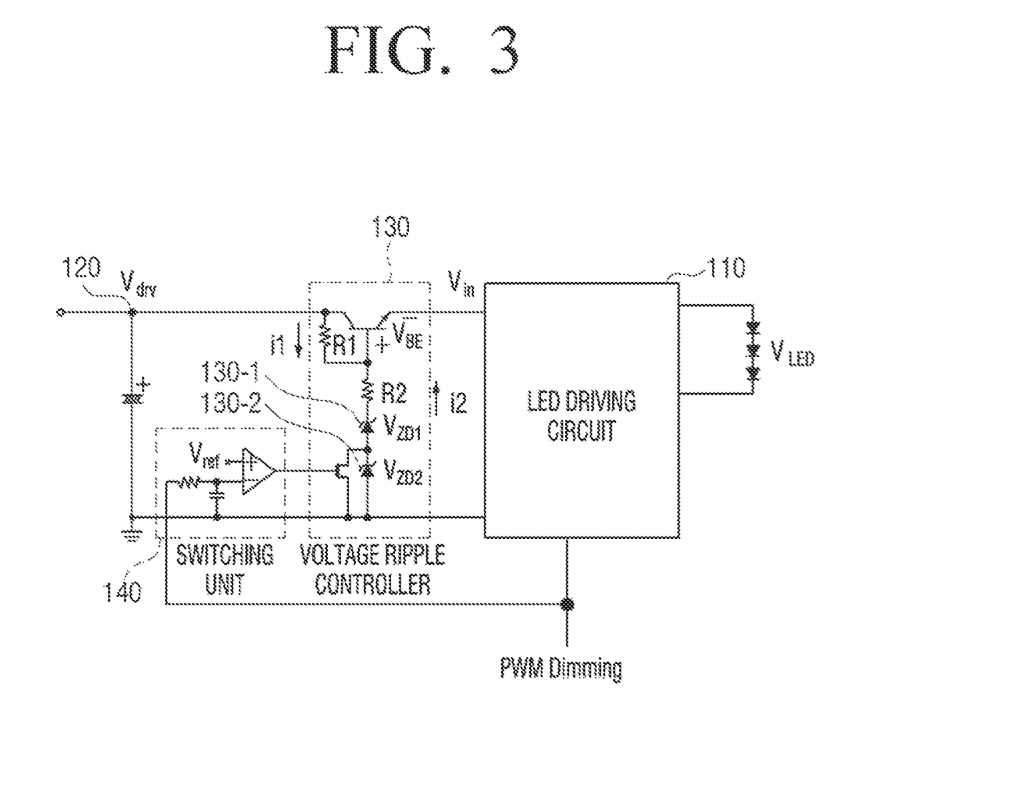
FIG. 3 is a circuit diagram illustrating a detailed configuration of the LED driving apparatus of FIG. 2.

FIG. 3 is a circuit diagram illustrating a detailed configuration of the LED driving apparatus of FIG. 2.

As illustrated in FIG. 3, the voltage ripple controller 130 and the switching unit 140 may include a plurality of elements, respectively.

The voltage ripple controller 130 according to an embodiment may include a first constant voltage element 130-1 and a second constant voltage element 130-2. The first and second constant voltage elements 130-1 and 130-2 may be connected in series.

Figure 4:
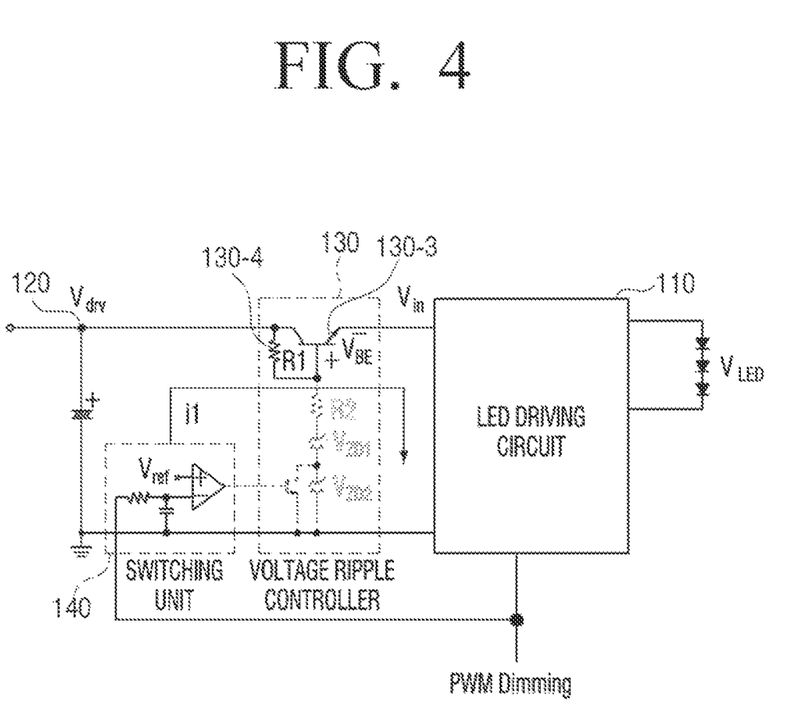
FIG. 4 is a circuit diagram illustrating an operation of an LED driving apparatus according to an embodiment.

The switching unit 140 may include a switch connected to one end and the other end of the second constant voltage element 130-2. For example, the second constant voltage element 130-2 and the switch may be connected in parallel. Here, the switch is not necessarily included in the switching unit 140 and may be included in the voltage ripple controller 130. In this example, the switching unit 140 may output a signal for controlling the on or off of the switch, and thus, the switching unit 140 may be implemented in a form by which the on or off state of the voltage ripple controller 130 may be controlled. FIG. 4 is a circuit diagram illustrating an operation of an LED driving apparatus according to an embodiment.

The LED driving apparatus 100 according to an embodiment may apply a voltage or to the LED panel or allow a current to flow so that a gray level corresponding to an input signal may be displayed on the LED panel. The LED driving apparatus 100 according to an embodiment may express a gray scale by differentiating times for applying a voltage for each gray level. As an example, the LED driving apparatus 100 according to an embodiment may adjust a voltage application time relatively long in a high gray level, and may adjust a voltage application time relatively short at a low gray level.

If the duty ratio of the PWM dimming signal becomes excessively too low in a low gray level having a relatively short voltage application time, a flickering which the human eye may recognize may be generated as the ripple of the voltage or current occurs. The LED driving apparatus 100 according to an embodiment may prevent the generation of a voltage or current ripple by identifying whether the duty ratio of the PWM dimming signal is greater than or equal to, or less than a predetermined threshold value.

As shown in FIG. 4, if the duty ratio of the PWM dimming signal is greater than or equal to a predetermined threshold value, the switching unit 140 may turn on the second constant voltage element 130-2 through the switch so that the internal voltage of the voltage ripple controller 130 is greater than the driving voltage $V_{DRV}$. Accordingly, the switching unit 140 may control the voltage ripple controller 130 to provide the driving voltage to the LED driving circuit 110. The switching unit 140 may turn on the second constant voltage element 130-2 by turning off (or opening) the switch, and may control so that the internal voltage of the voltage ripple controller 130 to be greater than the $V_{DRV}$.

According to an embodiment, the PWM dimming signal may have a high or low (On or Off) signal. Accordingly, a current may flow in the LED driving circuit 110 by the PWM dimming signal.

Referring to FIG. 4, the voltage ripple controller 130 may include a first transistor 130-3 and a first resistance 130-4.

According to an embodiment, if the duty ratio of the PWM dimming signal is greater than or equal to a predetermined threshold value, the switching unit 140 may turn off (or open) the switch to turn on the second constant voltage element 130-2, and may control the internal voltage of the voltage ripple controller 130 to be greater than the driving voltage $V_{DRV}$. The internal voltage of the voltage ripple controller 130 may be the sum ($V_{ZD1}+V_{ZD2}$) of the voltage of the first constant voltage element ($V_{ZD1}$) and the voltage of the second constant voltage element ($V_{ZD2}$), and the internal voltage may be greater than the driving voltage ($V_{ZD1}+V_{ZD2}>V_{DRV}$). In this example, the voltage ripple controller 130 may provide the driving voltage dropped by the first resistance 130-4 and the first transistor 130-3 to the LED driving circuit 110.

Referring to FIG. 4, the driving voltage dropped by the first voltage drop ($i_1 * R_1$) generated by the first resistance 130-4 and the second voltage drop ($-V_{BE}$) generated by the first transistor 130-3 may be provided to the LED driving circuit 110 according to the first current i1 flowing between the power supply unit 120 and the voltage ripple controller 130. The dropped driving voltage may be represented by the following Equation 1:

$$V_{in}=V_{DRV}-i_1*R_1-V_{BE} \approx V_{DRV}$$ [Equation 1]

$V_{in}$ may refer to the input voltage provided to the LED driving circuit, $V_{DRV}$ may refer to the driving voltage supplied by the power supply unit, $i_1*R_1$ may refer to the first voltage drop, and the $V_{BE}$ may refer to the second voltage drop.

The first voltage drop ($iI_1*R_1$) and the second voltage drop ($V_{BE}$) may be implemented with a very small value. For example, the first resistances $R_1$ (130-4) may be implemented to be sufficiently small, and the second voltage drop $V_{BE}$ may be about 0.7V. Accordingly, the input voltage $V_{in}$ for the LED driving circuit 110 may have a similar value to the driving voltage $V_{DRV}$.

Figure 5:
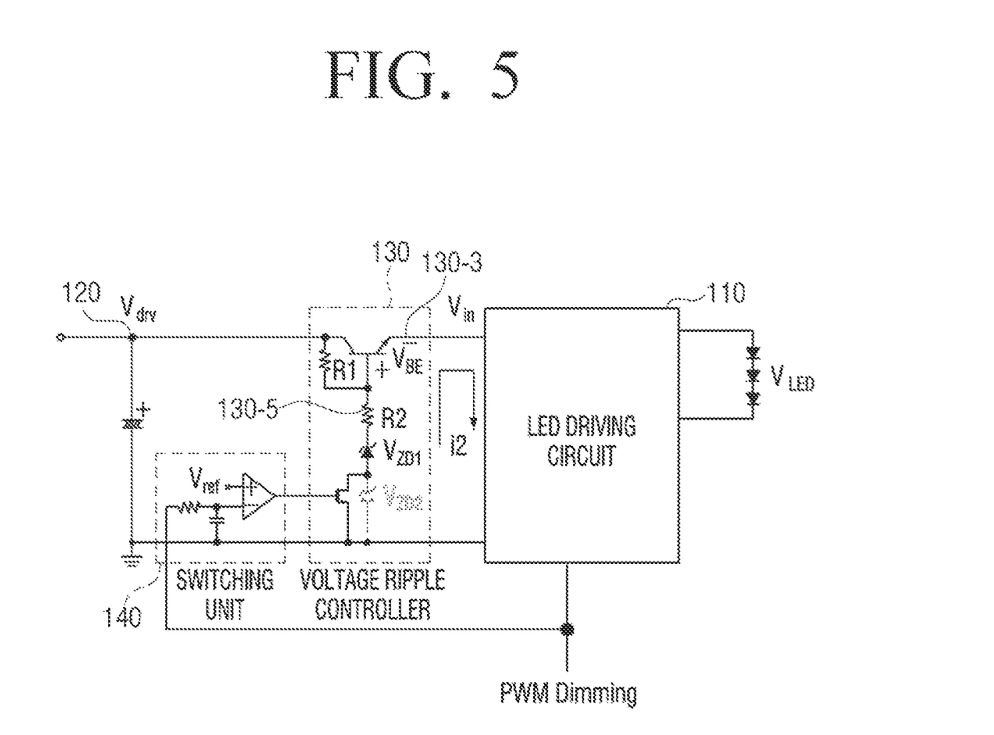
FIG. 5 is a circuit diagram illustrating an operation of an LED driving apparatus according to another embodiment.

FIG. 5 is a circuit diagram illustrating an operation of an LED driving apparatus according to another embodiment.

Based on the duty ratio of the PWM dimming signal being less than a predetermined threshold value, the switching unit 140 according to an embodiment may turn off the voltage ripple controller 130 to control the internal voltage of the voltage ripple controller 130 to be provided to the LED driving circuit 110.

For example, the switching unit 140 may turn on (or close) the switch to turn off the second constant voltage element 130-2, and may control so that the internal voltage of the voltage ripple controller 130 is smaller than the $V_{DRV}$. The internal voltage of the voltage ripple controller 130 may be the voltage $V_{ZD1}$ of the first constant voltage element 130-1, and the internal voltage may be less than the driving voltage ($V_{ZD1}<V_{DRV}$).

If the internal voltage of the voltage ripple controller 130 is the voltage $V_{ZD1}$ of the first constant voltage element 130-1 and the internal voltage is less than the driving voltage, the voltage of the first constant voltage element 130-1 may be provided to the LED driving circuit.

As shown in FIG. 5, the voltage ripple controller 130 may include a first transistor 130-3 and a second resistance 130-5. In this example, the voltage ripple controller 130 may provide the voltage $V_{ZD1}$ of the first constant voltage element dropped by the first transistor 130-3 and the second resistor 130-5 to the LED driving circuit 110.

Referring to FIG. 5, the voltage corresponding to the first constant voltage element dropped based on the third voltage drop ($i_2*R_2$) generated by the second resistance 130-5 and the second voltage drop $V_{BE}$ generated by the first transistor 130-3 according to the second current $i_2$ flowing between the voltage ripple controller 130 and the LED driving circuit 110 may be provided to the LED driving circuit 110. The voltage corresponding to the dropped first constant voltage element may be represented by the following Equation 2:

$$V_{in}=V_{ZD1}+i_2*R_2-V_{BE} \approx V_{ZD1}$$ [Equation 2]

The $V_{in}$ refers to the input voltage provided to the LED driving circuit, $V_{ZD1}$ refers to voltage of the first constant voltage element, $i_2*R_2$ is the third voltage drop, and $V_{BE}$ is the second voltage drop.

According to an embodiment, the second resistances $R_2$ (130-5) may be implemented to be sufficiently large, so that the current flowing in the first constant voltage element may be limited. Accordingly, the input voltage $V_{in}$ for the LED driving circuit 110 may be clamped to a voltage similar to the voltage $V_{ZD1}$ of the first constant voltage element regardless of the driving voltage $V_{DRV}$. In the example of low grayscale, that is, when the PWM dimming signal is a low signal, the current flowing in the LED driving circuit 110 may be very small, and thus the heat dissipation of the first transistor 130-3 may not be large.

Equations 1 and 2 may be calculated using KVL, KCL, or the like, according to the Kirchhoff's Rules in the closed circuit between the power supply unit 120 and the voltage ripple controller 130, and the closed circuit between the voltage ripple controller 130 and the LED driving circuit 110, respectively.

For example, since the internal voltage is greater than the driving voltage in Equation 1 ($V_{ZD1}+V_{ZD2}>V_{DRV}$), the current $i_1$ may flow in the closed circuit between the power supply unit 120 and the LED driving circuit 110, and the current may not flow in the internal circuit of the voltage ripple controller 130, that is, the second resistance $R_2$ (130-5), and the first and second constant voltage elements. Accordingly, Equation 1 may be derived.

As another example, since the internal voltage is less than the driving voltage in Equation 2 ($V_{ZD1}<V_{DRV}$), the current $i_2$ may flow in the closed circuit between the voltage ripple controller 130 and the LED driving circuit 110, and no current may flow in to the power supply unit 120. Accordingly, Equation 2 may be derived.

Referring to FIGS. 3 to 5, the voltage ripple controller 130 may include the first resistance 130-4, the first transistor 130-3 connected to one end of the first resistor 130-4, and the second resistance 130-5 connected to the other end of the first resistance 130-4 and one end of the first constant voltage element 130-1.

One end of the second constant voltage element 130-2 may be connected to the other end of the first constant voltage element 130-1 and one end of the switching unit 140, and the other end of the second constant voltage element 130-2 may be connected to the other end of the switching unit 140. One end of the first constant voltage element 130-1 may be connected to the other end of the second resistance 130-5, and the other end of the first constant voltage element 130-1 may be connected to one end of the second constant voltage element 130-2.

Figure 6:
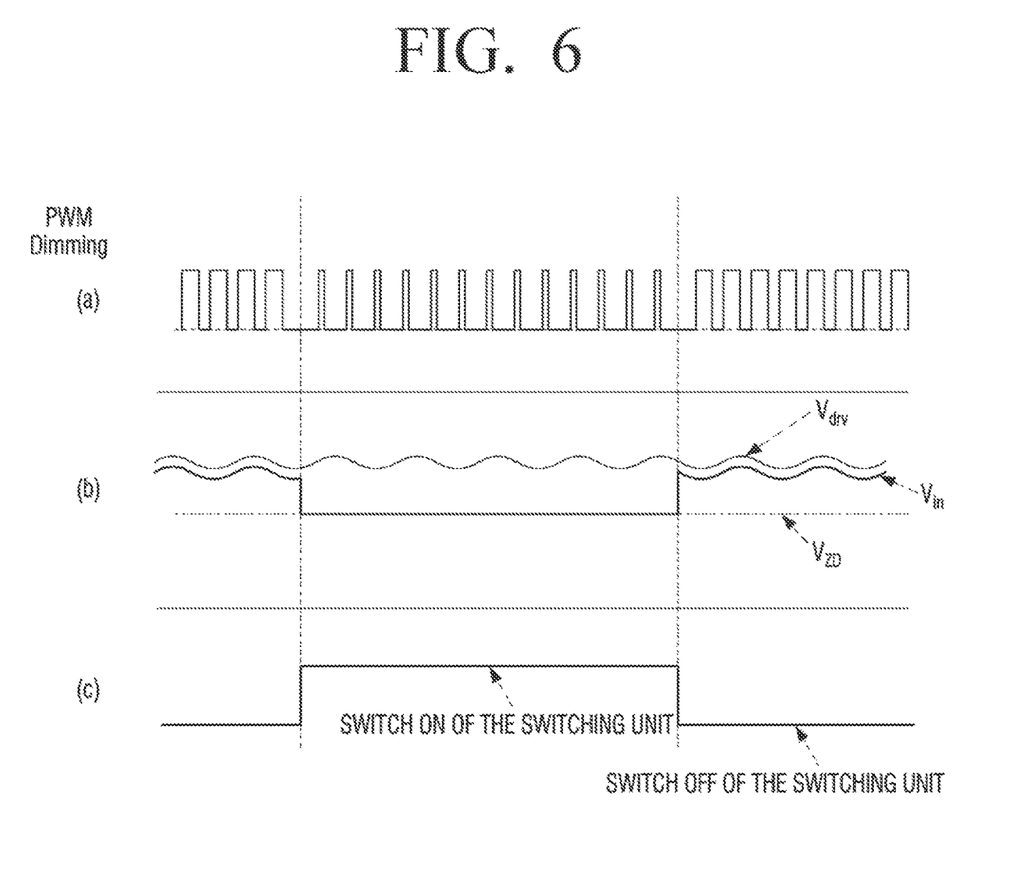
FIG. 6 is a graph illustrating an effect of applying the LED driving apparatus according to an embodiment.

FIG. 6 is a graph illustrating an effect of applying the LED driving apparatus according to an embodiment.

Referring to FIG. 6, if the duty ratio of the PWM dimming signal is greater than or equal to a predetermined threshold value, the input voltage $V_{in}$ generated by the first voltage drop generated in the first resistance 130-4 and the second voltage drop generated by the first transistor 130-3 may be provided to the LED driving circuit 110 at the $V_{DRV}$. If the duty ratio of the PWM dimming signal is greater than or equal to a predetermined threshold value, the voltage $V_{in}$ of the first constant voltage element 130-1 may be provided to the LED driving circuit 110.

The LED driving apparatus 100 according to an embodiment may identify whether the duty ratio of the PWM dimming signal is changed from greater than or equal to a predetermined threshold value to less than a predetermined threshold value. Referring to FIG. 6, when a change in the duty ratio of the PWM dimming signal is identified, the switching unit 140 may turn off the second constant voltage element 130-2 to control the internal voltage of the voltage ripple controller 130 to be smaller than the $V_{DRV}$ ($V_{ZD1}<V_{DRV}$). In this example, the input voltage $V_{in}$ to the LED driving circuit 110 may be the voltage $V_{ZD1}$ of the first constant voltage element.

Figure 7:
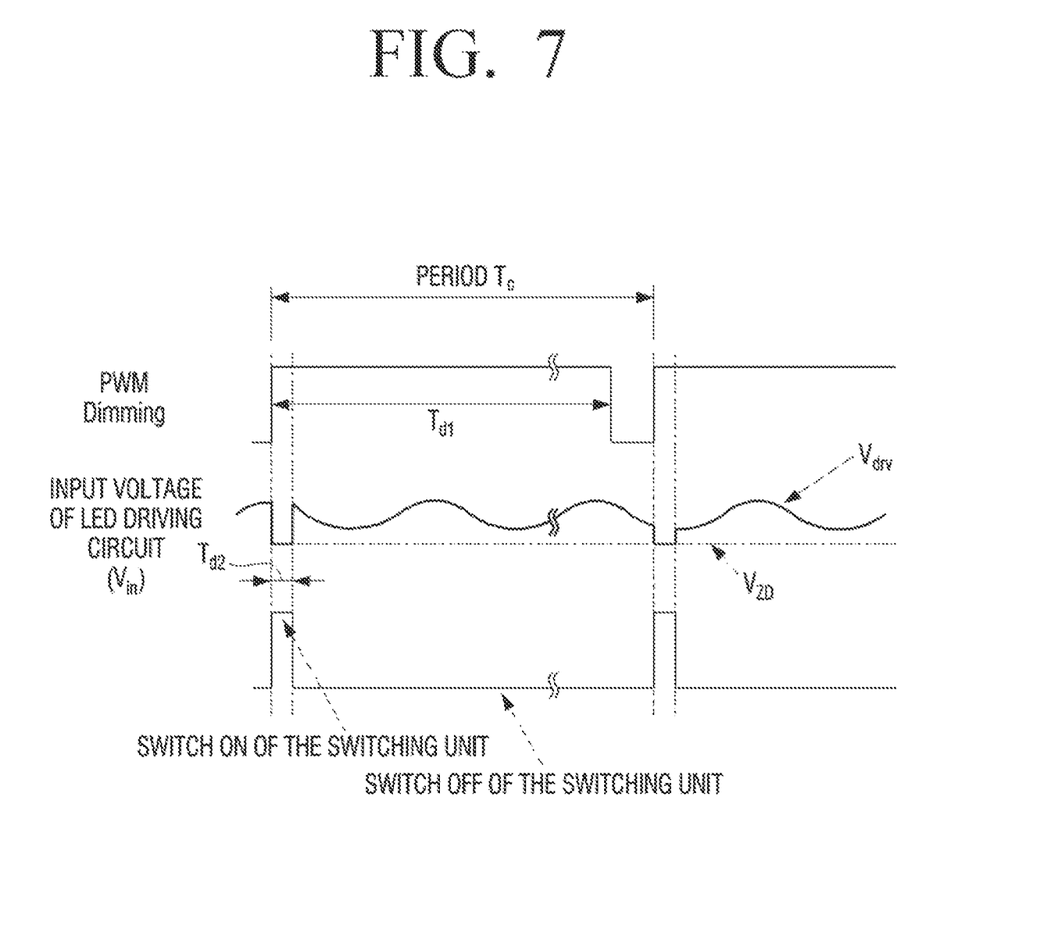
FIG. 7 is a graph illustrating an LED driving apparatus according to another embodiment.

FIG. 7 is a graph illustrating an LED driving apparatus according to another embodiment.

Referring to FIG. 7, the LED driving apparatus 100 according to another embodiment may turn on or off a switch based on a high signal of a PWM dimming signal. The PWM dimming signal may have a waveform Tc in a predetermined period, and a high signal of the PWM dimming signal may occur at an interval of a predetermined period Tc.

The LED driving apparatus 100 may turn on or off the switch at intervals in which the high signal of the PWM dimming signal is generated, in addition to the duty ratio of the PWM dimming signal. The LED driving apparatus 100 may turn on or off the switch at predetermined intervals, rather than identifying whether the duty ratio of the PWM dimming signal is less than or equal to a predetermined threshold. Here, the switch may be turned on for a period of time corresponding to the period interval. For example, the switch may not be turned on while a high signal of the PWM dimming signal is generated, but may be turned on for a relatively short time.

Referring to FIG. 7, the switching unit 140 may turn on the switch at a duty ratio different from the duty ratio of the PWM dimming signal based on the period Tc of the PWM dimming signal. For example, in period Tc, the PWM dimming signal may have a first duty ratio (100*Td1/Tc), and the switching unit 140 may have a second duty ratio (100*Td2/Tc). The switching unit 140 may turn on the switch based on the second duty ratio.

Figure 8:
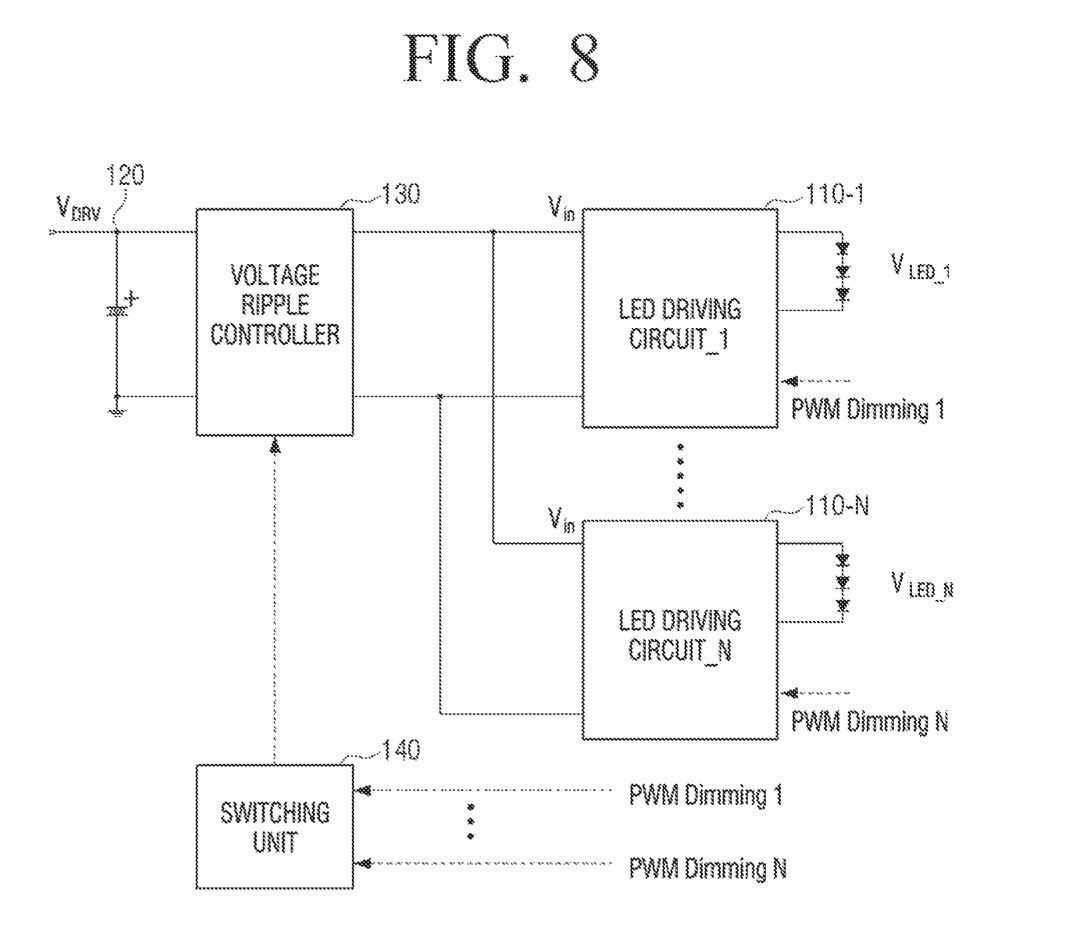
FIG. 8 is a circuit diagram illustrating a configuration of the LED driving apparatus according to another embodiment.

FIG. 8 is a circuit diagram illustrating a configuration of the LED driving apparatus according to another embodiment.

The LED driving circuit 110 according to an embodiment may include a plurality of LED driving circuits 110-1, . . . , to 110-n. The switching unit 140 may turn on or off the voltage ripple controller 130 according to the average value of the duty ratio of the PWM dimming signal provided to each of the plurality of LED driving circuits 110-1, . . . , 110-n, respectively.

According to an embodiment, the LED driving circuit 110 may be provided in an LED region including a plurality of LED elements. The LED driving circuits 110-1, . . . , and 110-n may be provided in each of the plurality of LED regions. The LED region may be referred to as an LED module, an LED cabinet, or the like, but is commonly referred to as an LED region for convenience.

The LED driving apparatus 100 according to an embodiment may include the LED driving circuit 110, the voltage ripple controller 130, and the switching unit 140 in each of the plurality of LED regions, and may control an input voltage Vin for each region.

For example, when the gray level of the input signal is implemented, the duty ratio of the current or the voltage application to each of the gray levels of each LED region may become different, that is, the gray scale may be expressed differently for each LED region. Generation of flickering in at least one region among a plurality of LED regions may be prevented.

The embodiment is not limited thereto, and by identifying whether an average value of the duty ratio of the PWM dimming signal provided to each of the plurality of LED driving circuits 110-1, ..., 110-n is greater than or equal to, or less than a predetermined threshold value, the voltage may be controlled through integrating $V_{in}$ for a plurality of LED regions according to an identification result. The LED region may be implemented as a liquid crystal display (LCD), an organic light emitting diode (OLED), an active-matrix OLED (AMOLED), a plasma display panel (PDP), or the like.

Figure 9:
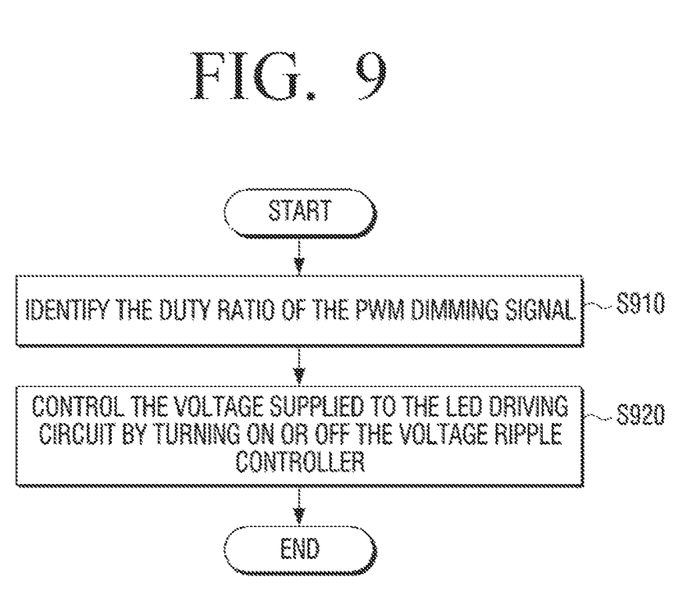
FIG. 9 is a flow chart illustrating a control method of the Led driving apparatus according to an embodiment.

FIG. 9 is a flow chart illustrating a control method of the Led driving apparatus according to an embodiment.

A control method of an LED driving apparatus including an LED driving circuit, a power supply unit configured to supply a driving voltage to the LED driving circuit, and a voltage ripple controller located between the LED driving circuit and the power supply unit may identify a duty ratio of a pulse width modulation (PWM) dimming signal in operation S910.

By turning on or off the voltage ripple controller according to an identification result, voltage provided to the LED driving circuit may be controlled in operation S920.

In operation S920 for controlling voltage according to an embodiment may include, based on the duty ratio of the PWM dimming signal being less than a predetermined threshold value, controlling an internal voltage of the voltage ripple controller to be supplied to the LED driving circuit by turning off the voltage ripple controller, and based on the duty ratio of the PWM dimming signal being greater than or equal to the predetermined threshold value, controlling the driving voltage to be supplied to the LED driving circuit by turning on the voltage ripple controller.

The voltage ripple controller according to an embodiment may include a first constant voltage element and a second constant voltage element, and the controlling the internal voltage of the voltage ripple controller to be supplied to the LED driving circuit may include, based on the duty ratio of the PWM dimming signal being less than the predetermined threshold value, controlling the voltage of the first constant voltage element to be supplied to the LED driving circuit by turning off the second constant voltage element through the switch included in the LED driving apparatus. The controlling the driving voltage to be supplied to the LED driving circuit may include, based on the duty ratio of the PWM dimming signal being greater than or equal to the predetermined value, controlling the driving voltage to be supplied to the LED driving circuit by turning on the second constant voltage element through the switch. Here, the switch may be connected to one end and the other end of the second constant voltage element.

The voltage ripple controller may further include a first resistance, a first transistor connected to one end of the first resistance, and a second resistance connected to other end of the first resistance and one end of the first constant voltage element, and the one end of the second constant voltage element may be connected to the other end of the first constant voltage element and the one end of the switch, and the other end of the second constant voltage element may be connected to the other end of the switch.

The controlling the internal voltage of the voltage ripple controller to be supplied to the LED driving circuit may include providing the voltage of the first constant driving element dropped by the first transistor and the second resistance to the LED driving circuit, and the controlling the driving voltage to be supplied to the LED driving circuit may include, based on the duty ratio of the PWM dimming signal being greater than the predetermined threshold value, providing the driving voltage dropped by the first resistance and the first transistor to the LED driving circuit.

The control method according to an embodiment may include based on identification that the duty ratio of the PWM dimming signal is changed from the predetermined threshold or more to less than the preset threshold value, turning off the second constant voltage element through the switch.

The controlling the voltage in operation S920 may include turning on or off the voltage ripple controller based on a high signal period interval of the PWM dimming signal.

The LED driving circuit according to an embodiment may include a plurality of LED driving circuits, and the step S920 of controlling the voltage may include controlling the voltage supplied to the LED driving circuit by turning on or off the voltage ripple controller according to an average value of the duty ratio of the PWM dimming signal supplied to each of the plurality of LED driving circuits. The various embodiments described above may be embodied in a recording medium which may be read by a computer or a similar device by using software, hardware or combination thereof. In some cases, the embodiments described herein may be implemented by the processor itself. According to a software implementation, embodiments such as the procedures and functions described herein may be implemented in separate software modules. Each of the software modules may perform one or more of the functions and operations described herein.

Computer instructions for performing a processing operation according to the above-described various embodiments may be stored in a non-transitory computer-readable medium. The computer instructions stored in the non-transitory computer-readable medium may allow a specific device to perform the processing operation according to the above-described embodiments when the computer instructions are executed through a processor.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, a read only memory (ROM), and the like.

The present teaching can be readily applied to other types of apparatuses. Also, the description of embodiments is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. A light emitting diode (LED) driving apparatus, comprising:
   an LED driving circuit;
   a power supply unit configured to supply a driving voltage to the LED driving circuit;
   a voltage ripple controller located between the LED driving circuit and the power supply unit; and
   a switching unit configured to control a voltage to be supplied to the LED driving circuit by turning on or off the voltage ripple controller according to a duty ratio of a pulse width modulation (PWM) dimming signal, wherein the voltage ripple controller comprises a first constant voltage element and a second constant voltage element, wherein the switching unit comprises a switch connected to a first end and a second end of the second constant voltage element, and wherein the switching unit is further configured to:

based on the duty ratio of the PWM dimming signal being less than a predetermined threshold value, control a voltage of the first constant voltage element to be supplied to the LED driving circuit by turning off the second constant voltage element through the switch, and based on the duty ratio of the PWM dimming signal being greater than or equal to the predetermined threshold value, control the driving voltage to be supplied to the LED driving circuit by turning on the second constant voltage element through the switch.

2. The LED driving apparatus of claim 1, wherein the voltage ripple controller further comprises:

a first resistance;

a first transistor connected to a first end of the first resistance; and a second resistance connected to a second end of the first resistance and a first end of the first constant voltage element, and wherein the first end of the second constant voltage element is connected to a second end of the first constant voltage element and a first end of the switching unit, and the second end of the second constant voltage element is connected to a second end of the switching unit.

3. The LED driving apparatus of claim 2, wherein, based on the duty ratio of the PWM dimming signal being greater than or equal to the predetermined threshold value, the driving voltage is dropped by the first resistance and the first transistor and is supplied to the LED driving circuit, and wherein, based on the duty ratio of the PWM dimming signal being less than the predetermined threshold value, the voltage of the first constant voltage element is dropped by the first transistor and the second resistance and is supplied to the LED driving circuit.

4. The LED driving apparatus of claim 1, wherein the switching unit is further configured to, based on identification that the duty ratio of the PWM dimming signal is changed from the predetermined threshold value or more to less than the predetermined threshold value, turn off the second constant voltage element through the switching unit.

5. The LED driving apparatus of claim 1, wherein the LED driving circuit comprises a plurality of LED driving circuits, and wherein the switching unit is further configured to turn on or off the voltage ripple controller according to an average value of the duty ratio of the PWM dimming signal supplied to each of the plurality of LED driving circuits.

6. The LED driving apparatus of claim 1, wherein the switching unit is further configured to turn on or off the voltage ripple controller based on a high signal period interval of the PWM dimming signal.

7. A control method of a light emitting diode (LED) driving apparatus comprising an LED driving circuit, a power supply unit to supply a driving voltage to the LED driving circuit and a voltage ripple controller located between the LED driving circuit and the power supply unit, the control method comprising:

identifying a duty ratio of a pulse width modulation (PWM) dimming signal; and controlling a voltage to be supplied to the LED driving circuit by turning on or off the voltage ripple controller according to a result of the identifying, wherein the voltage ripple controller comprises a first constant voltage element and a second constant voltage element, wherein the controlling the voltage to be supplied to the LED driving circuit comprises:

based on the duty ratio of the PWM dimming signal being less than a predetermined threshold value, controlling a voltage of the first constant voltage element to be supplied to the LED driving circuit by turning off the second constant voltage element through a switch included in the LED driving apparatus, based on the duty ratio of the PWM dimming signal being greater than or equal to the predetermined threshold value, controlling the driving voltage to be supplied to the LED driving circuit by turning on the second constant voltage element through the switch, and wherein the switch is connected to a first end and a second end of the second constant voltage element.

8. The control method of claim 7, wherein the voltage ripple controller further comprises a first resistance, a first transistor connected to a first end of the first resistance, and a second resistance connected to a second end of the first resistance and a first end of the first constant voltage element, and wherein the first end of the second constant voltage element is connected to a second end of the first constant voltage element and a first end of the switch, and the second end of the second constant voltage element is connected to a second end of the switch.

9. The control method of claim 8, wherein the controlling the voltage of the first constant voltage element to be supplied to the LED driving circuit comprises:

providing the voltage of the first constant voltage element dropped by the first transistor and the second resistance to the LED driving circuit, and wherein the controlling the driving voltage to be supplied to the LED driving circuit comprises:

based on the duty ratio of the PWM dimming signal being greater than or equal to the predetermined threshold value, supplying the driving voltage dropped by the first resistance and the first transistor to the LED driving circuit.

10. The control method of claim 7, further comprising, based on identification that the duty ratio of the PWM dimming signal is changed from the predetermined threshold value or more to less than the predetermined threshold value, turning off the second constant voltage element through the switch.

11. The control method of claim 7, wherein the controlling the voltage comprises turning on or off the voltage ripple controller based on a high signal period interval of the PWM dimming signal.

* * * * *